United States Patent
Si

(10) Patent No.: US 8,317,646 B2
(45) Date of Patent: Nov. 27, 2012

(54) RECONFIGURABLE HYBRID POWER TRAIN

(75) Inventor: Baojun Si, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 337 days.

(21) Appl. No.: 12/821,372

(22) Filed: Jun. 23, 2010

(65) Prior Publication Data

US 2011/0319211 A1 Dec. 29, 2011

(51) Int. Cl.
*F16H 3/72* (2006.01)
*F16H 37/06* (2006.01)
*F16H 3/44* (2006.01)

(52) U.S. Cl. ............................. 475/5; 475/286
(58) Field of Classification Search ............... 475/5, 286
See application file for complete search history.

(56) References Cited

U.S. PATENT DOCUMENTS

| | | | |
|---|---|---|---|
| 5,558,595 A | 9/1996 | Schmidt et al. | |
| 6,478,705 B1 | 11/2002 | Holmes et al. | |
| 6,592,484 B1 | 7/2003 | Tsai et al. | |
| 6,837,816 B2 | 1/2005 | Tsai et al. | |
| 7,128,675 B2 | 10/2006 | Klemen et al. | |
| 7,172,525 B2 | 2/2007 | Sowul et al. | |
| 7,220,202 B2 | 5/2007 | Singh et al. | |
| 7,288,041 B2 * | 10/2007 | Bucknor et al. | 475/151 |
| 7,300,374 B2 | 11/2007 | Bucknor et al. | |
| 7,967,711 B2 * | 6/2011 | Conlon et al. | 475/5 |

* cited by examiner

*Primary Examiner* — David D Le
*Assistant Examiner* — Colby M Hansen
(74) *Attorney, Agent, or Firm* — Leydig, Voit & Mayer

(57) ABSTRACT

A multi-mode hybrid drive train offers selective operation in any one of series, parallel, and power split modes. The multi-mode hybrid drive train includes two planetary gear sets and a collection of specifically placed brakes and clutches relative to those gear sets. The first planetary gear train includes a power input for receiving power from a primary rotational power source, as well as a first sun gear, first carrier and first ring gear. The second planetary gear train similarly includes a power input as well as a second sun gear, a second carrier connected to a final drive, and a second ring gear. A first motor is linked to the first sun gear and a second motor is linked to the second sun gear such that selective activation of the clutches, brakes, and motors places the multi-mode hybrid drive train in a selected mode of operation.

17 Claims, 6 Drawing Sheets

|  | B1 engaged | B2 engaged | B3 engaged | C1 engaged | C2 engaged | Motor 1 status | Motor 2 status |
|---|---|---|---|---|---|---|---|
| Parking (engine off) | y | y | y | y | y | off | off |
| Parking (engine on) |  | y | y | y |  | off | off |
| Neutral | n | n | n | n | n | off | off |
| Engine start (parking) |  | y | y | y |  | m | off |
| Engine start (neutral) |  |  | y |  |  | m | off |
| Forward (low speed) Input eVT |  | y |  | y |  | g | m |
| Forward (high speed) Compound eVT |  |  |  | y | y | g/m | g/m |
| Reverse (eRev) |  | y |  |  |  | off | m(rev) |
| Reverse (Series hyRev) |  | y | y |  |  | g | m (rev) |
| eDrv 1 |  | y |  |  |  | off | m |
| eDrv 2 |  | y |  |  | y | m | m |

RECONFIGURABLE HYBRID POWER TRAIN

TECHNICAL FIELD

This patent disclosure relates generally to power transmission systems and, more particularly to a reconfigurable power transmission system that provides multiple modes of operation.

BACKGROUND

In any power transmission system for providing machine movement, it is important to efficiently transfer power from a power source to a driven implement such as a wheel, track, or other ground-engaging system. With respect to electrical/hybrid drive trains, various transmission formats have arisen to provide this function, each having distinct advantages, as well as potential disadvantages relative to the others. Such formats include for example series, parallel and power split formats.

Unfortunately, the formats are generally mutually exclusive, and it has been necessary to forgo the advantages of all but one format in any given implementation. As a result designers have been required to select the format with the most advantages for a particular implementation, with the understanding that the selected format will in some instances be disadvantageous. For example, a format that provides efficient high speed operation may be inefficient or ineffective during a different mode of operation such as start up.

Thus, although electrical/hybrid machines have in general been very successful, the available drive trains have been inadequate to fully realize the benefits of these power systems. The disclosed principles provide a mechanism for overcoming the noted deficiencies as will be appreciated from the following description.

SUMMARY

In an aspect of the disclosed principles, a multi-mode hybrid drivetrain is provided for selective operation in any one of series, parallel, and power split modes. The multi-mode hybrid drive train includes two planetary gear sets and a collection of specifically placed brakes and clutches relative to those gear sets. The first planetary gear train includes a power input for receiving power from a primary rotational power source, as well as a first sun gear, first carrier and first ring gear. The second planetary gear train similarly includes a power input as well as a second sun gear, a second carrier connected to a final drive, and a second ring gear.

For configuration, the multi-mode hybrid drive train includes a first clutch for selectively clutching the first carrier to the second carrier and a second clutch for selectively clutching the first sun gear to the second ring gear. It further includes a first brake for selectively braking the first carrier, a second brake for selectively braking the first sun gear, and a third brake for selectively braking the second ring gear. A first motor is linked to the first sun gear and a second motor is linked to the second sun gear such that activation of the clutches, brakes, and motors in a first combination places the multi-mode hybrid drivetrain in a series mode of operation, activation of the clutches, brakes, and motors in a second combination places the multi-mode hybrid drive train in a parallel mode of operation, and activation of the clutches, brakes, and motors in a third combination places the multi-mode hybrid drive train in a power split mode of operation.

Further aspects and features of the disclosed principles will be appreciated from the following detailed description and the accompanying drawings, of which:

BRIEF DESCRIPTION OF THE DRAWINGS

FIG. 6 is a chart illustrating actuation settings correlated to various operational modes in an embodiment of the disclosed principles.

DETAILED DESCRIPTION

In overview, this disclosure relates to power transmission in electrical/hybrid systems, and the disclosed principles provide a drivetrain that may be reconfigured in real-time through the engagement or disengagement of multiple control units (brakes and clutches), to generate various drive train configurations including series, parallel and CVT. In one embodiment, the system employs two clutches, three brakes and two planetary gear trains to provide reconfigurability as well as to provide multiple operational modes such as neutral, electrical reverse, engine start/stop, extended driving duration, etc.

Figure 1:
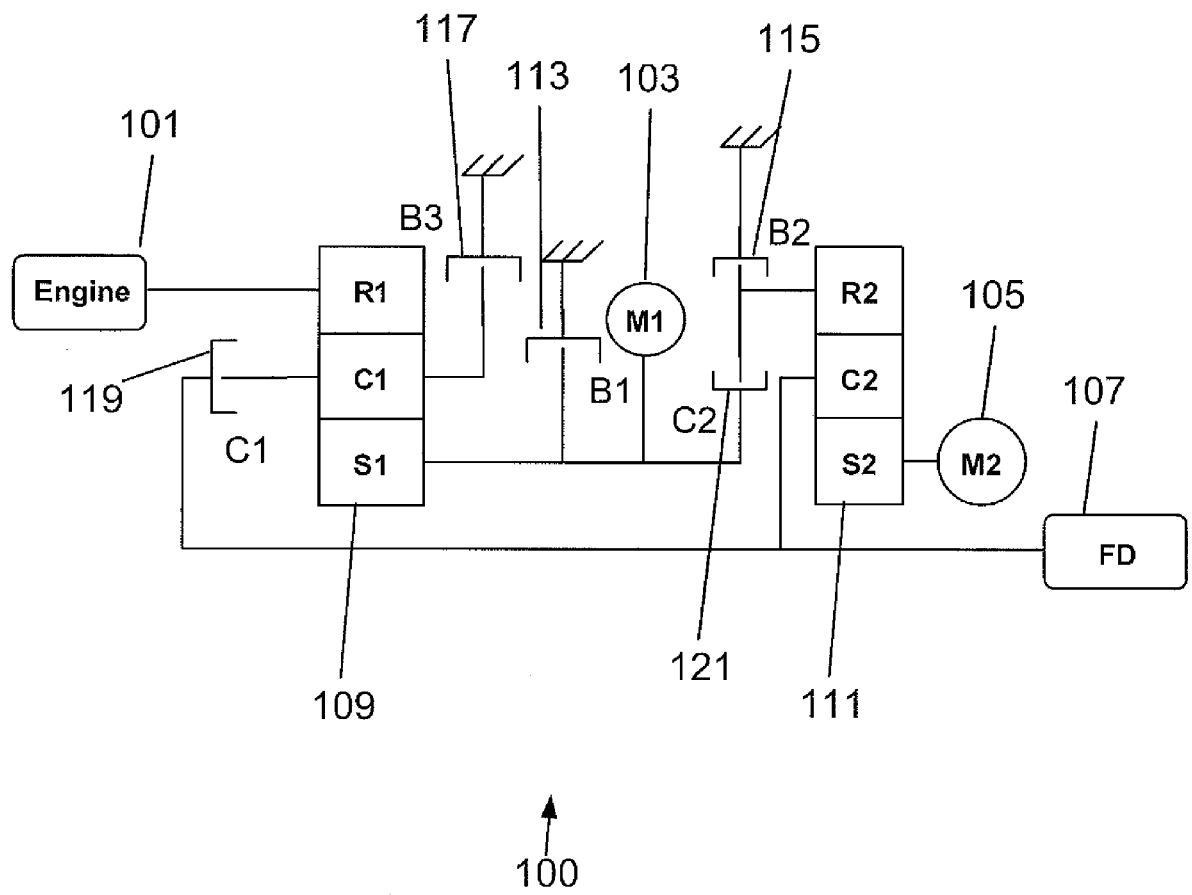
FIG. 1 is a schematic view of a reconfigurable power transmission according to an embodiment of the described principles.

Turning to the figures, FIG. 1 is a schematic view of a reconfigurable power transmission according to an embodiment of the described principles. As can be seen, the drivetrain 100 of FIG. 1 takes a power input from an engine 101 or other type of primary power source (hydraulic motor, etc), as well as taking power from or providing power to two motor/generator units including a first motor/generator unit 103 and a second motor/generator unit 105. The output of the drivetrain 100 is provided at a final drive 107, e.g., to drive a ground engaging track/wheel/sprockets, etc.

The disclosed drive train 100 includes a number of transmission elements and actuators to provide drive and reconfiguration functions. These include a first planetary gear set 109 and a second planetary gear set 111, as well as a first brake (B1) 113, a second brake (B2) 115, and a third brake (B3) 117. The system 100 further includes a first clutch (C1) 119 and a second clutch (C2) 121. The engine 101 provides a power input to the ring gear R1 of the first planetary gear set 109 while the carrier C1 of the first planetary gear set 109 is clutched via the first clutch 119 to the carrier C2 of the second planetary gear set 111 and to the final drive 107. The carrier C1 of the first planetary gear set 109 is also linked to the third brake 117. The sun gear S1 of the first planetary gear set 109 is linked to the first brake 113 and the first motor/generator 103, as well as being clutched via the second clutch 121 to the ring gear R2 of the second planetary gear set 111. The ring gear R2 of the second planetary gear set 111 is also linked to the second brake 115. The sun gear S2 of the second planetary gear set 111 is linked to the second motor/generator 105.

Figure 2:
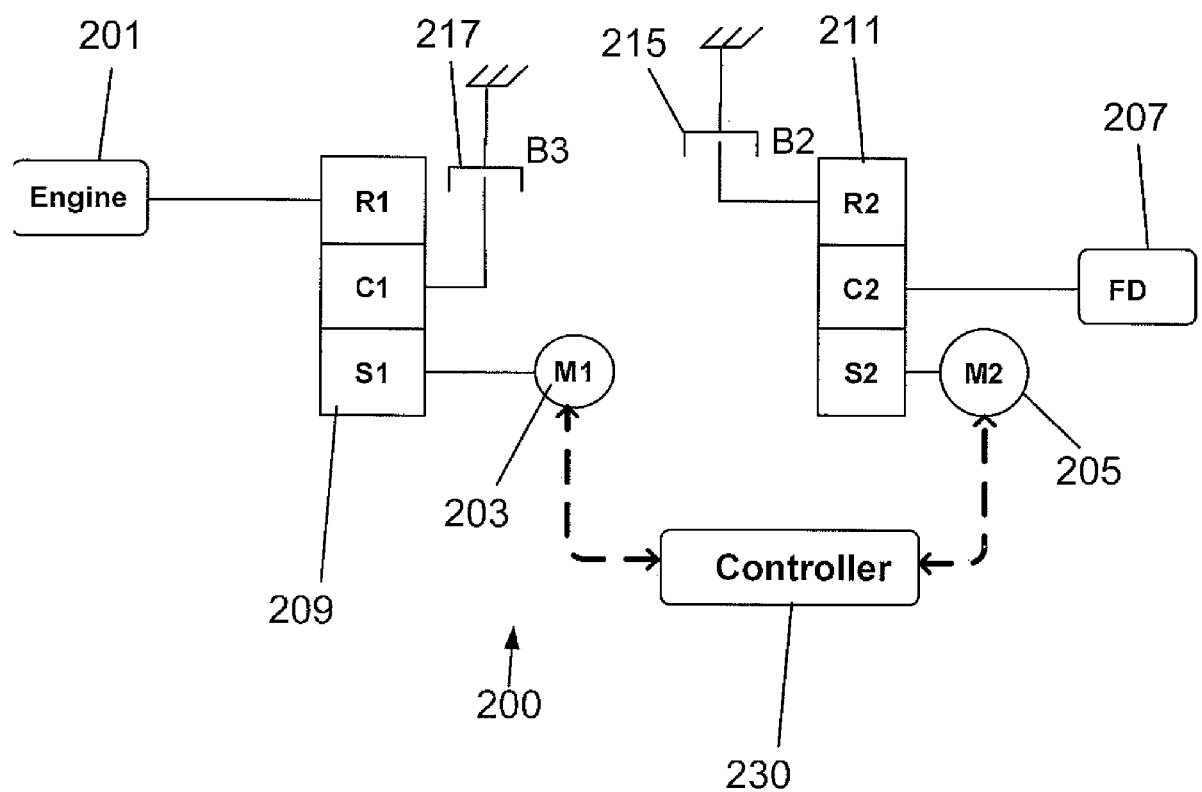
FIG. 2 is a schematic view of the reconfigurable power transmission of FIG. 1, showing clutch, brake, and electrical inputs/outputs arranged to provide a series mode configuration.

Selective actuation of the first brake 113, second brake 115, third brake 117, first clutch 119 and second clutch 121 is used to reconfigure the drive train 100 to correspond to a series, parallel or CVT format or configuration. FIG. 2 illustrates an example of a series mode configuration. In particular, the illustrated drive train 200 is configured such that the engine 201 drives the first motor/generator 203, which is acting as a generator, through the first planetary gear set 209. This generates power for use by the second motor/generator 205, which is acting as a motor. A motor controller 230 may be used to manage the transfer of energy to the second motor/generator 205. The second motor/generator 205 in turn drives the final drive 207 via the second planetary gear set 211.

In order to provide this configuration, the second brake 215 and the third brake 217 are engaged. In this way, the input to the first motor/generator 203 (i.e., the output of the first planetary gear set 209) is directly proportional to the speed of the engine 201 and the output of the second planetary gear set 211 is directly proportional to its input, i.e., to the speed of the second motor/generator 205. Thus, in this configuration, the generation and use of electrical power occur in series, with no direct mechanical link between the engine 201 and the final drive 207.

Figure 3:
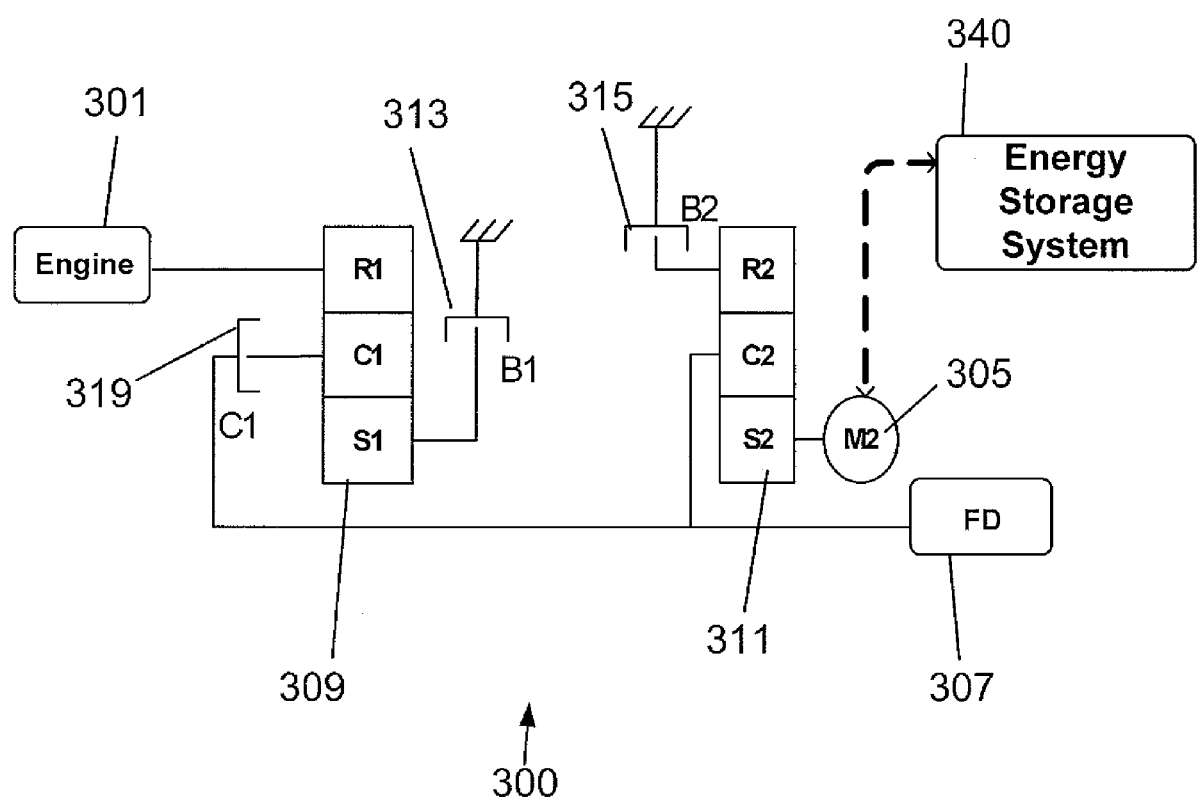
FIG. 3 is a schematic view of the reconfigurable power transmission of FIG. 1, showing clutch, brake, and electrical inputs/outputs arranged to provide a parallel mode configuration.

As noted above, the disclosed drive train may also be configured to provide parallel operation, i.e., wherein the final drive is driven by one or both of an engine and an electric motor operating in parallel. FIG. 3 illustrates the reconfigurable power transmission of FIG. 1, showing clutch, brake, and electrical inputs/outputs actuated so as to provide a parallel mode configuration. In the illustrated configuration, the first clutch 319, the first brake 313, and the second brake 315 are actuated. In particular, the first clutch 319 links the carrier C1 of the first planetary gear set 309 to the final drive 307 and to the carrier C2 of the second planetary gear set 311. The first brake 313 brakes the sun gear S1 of the first planetary gear set 309 while the second brake 315 brakes the ring gear R2 of the second planetary gear set 311.

As a result of these actuations, the engine 301 provides power to the final drive 307 at a ratio set by the gear ratios of the first planetary gear set 309 while the second motor/generator 305 is linked to the final drive at a ratio set by the gears of the second planetary gear set 311. In this way, the second motor/generator 305 may either receive power from the engine 301 for storage in energy storage system 340 or draw energy from the energy storage system 340 and provide power to the final drive 307 in parallel with the engine 301.

Figure 4:
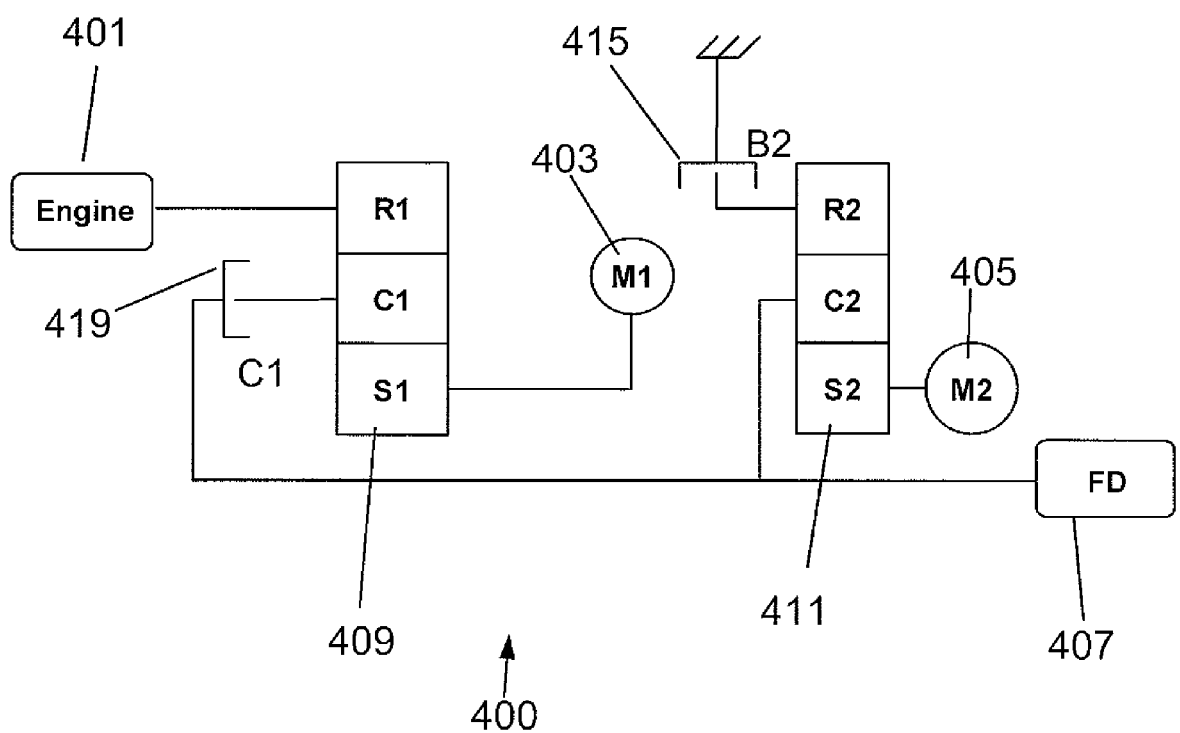
FIG. 4 is a schematic view of the reconfigurable power transmission of FIG. 1, showing clutch, brake, and electrical inputs/outputs arranged to provide an input CVT configuration.

FIG. 4 illustrates another configuration of the disclosed system, wherein the system is configured via selective actuation of braking and clutching mechanisms to operate in an input CVT configuration. In this configuration 400, the second brake 415 and first clutch 419 are actuated, respectively holding the ring gear R2 of the second planetary gear set 411 stationary and clutching the carrier C1 of the first planetary gear set 409 to the carrier C2 of the second planetary gear set 411 and to the final drive 407. In this configuration, the power, speed, and rotational direction of the final drive 407 are set by the first motor/generator 403 and the second motor/generator 405. Thus, this configuration provides a continuously variable output based on the control of two parallel inputs (the motor/generators).

Figure 5:
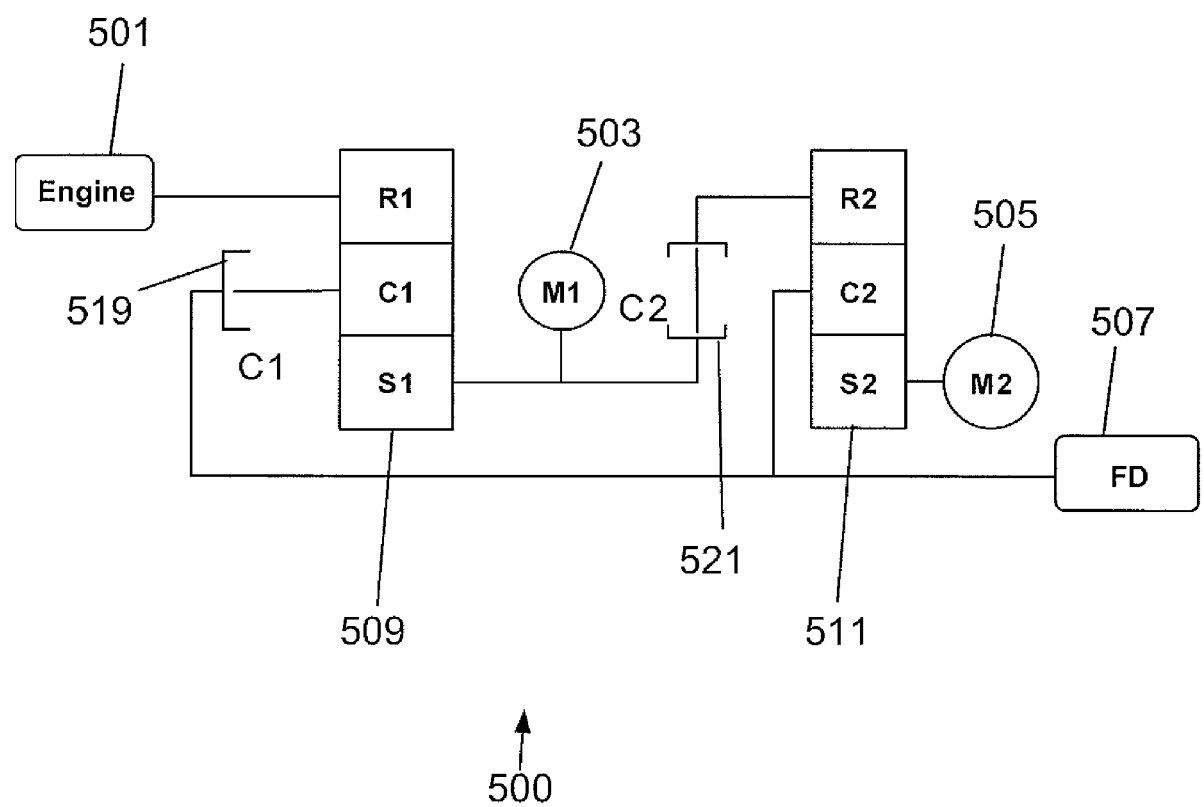
FIG. 5 is a schematic view of the reconfigurable power transmission of FIG. 1, showing clutch, brake, and electrical inputs/outputs arranged to provide a compound CVT configuration.

In a slightly different configuration, the system acts as a compound CVT, wherein the output characteristics are set by both motors, but wherein the effect of one of the motors is magnified by mechanical compounding. This configuration is illustrated in FIG. 5. As can be seen this configuration is created by the actuation of the first clutch 519 and the second clutch 521, while leaving the three brakes unactuated. This configuration is similar to the parallel input CVT configuration shown in FIG. 4.

However, rather than holding the ring gear R2 of the second planetary gear set 511 stationary, this gear is instead clutched to the first motor/generator 503 via the second clutch 521. In this way, the rotation of the first motor/generator 503 is transferred to both the sun gear S1 of the first planetary gear set 509 and the ring gear R2 of the second planetary gear set 511, providing a compounding effect with respect to the rotation of the first motor/generator 503.

Although the foregoing description discusses specific motor and engine types, the disclosed principles are also applicable with respect to other types of rotary machines. For example, the engine 101 may be any one of a number of fuel converter devices (e.g., gasoline engine, diesel engine, turbine engine, jet engine, etc.), or may be an electrical motion device or hydraulic motor. With respect to the first motor/generator 103 and second motor/generator 105, these were discussed above as being electrical motors/generators, but may be any other type of rotary power providing/generating device including for example hydraulic pump motors, pneumatic pumps (e.g., air compressors)/motors (e.g., air motors), etc.

In overview, and referring again to FIG. 1, it will now appreciated that selective actuation of the first brake 113, second brake 115, third brake 117, first clutch 119 and second clutch 121 will allow the disclosed transmission to operate in a selected mode optimized for current conditions. The actuation of various controls to provide expected modes of operation within these configurations will be briefly set forth for the convenience of the reader.

The chart 600 of FIG. 6 sets forth the actuation settings usable to achieve various operational modes. In particular, each mode is associated with an actuation mode for each of the first brake 113 (B1), second brake 115 (B2), third brake 117 (B3), first clutch 119 (C1) and second clutch 121 (C2). The chart 600 also sets forth the status of each motor in each mode. The motor modes include "off," generator ("g"), motor ("m") and motor-in-reverse ("m(rev)").

The modes described in the chart 600 include parking (engine off), parking (engine on), neutral, engine start (parking), engine start (neutral), forward (low speed), input eVT, forward (high speed), compound eVT, reverse (electrical powered reverse), reverse (series hybrid reverse), eDry 1 (driving on one motor), and eDry 2 (driving on two motors). It will be appreciated that this is an exemplary list of modes, and that other modes may be employed as well within the described principles.

While manual activation of the clutches and brakes of the hybrid transmission is possible, the clutches and brakes are controlled by a controller in an embodiment of the described principles. This is especially useful in modes where simultaneous control of the motors and engine is also required. The controller may be a dedicated controller or may be a portion of a machine controller, engine controller, or transmission controller. In any case, the controller is processor-driven and operates by reading computer-readable instructions, including data where appropriate, from a computer-readable medium, and computer-executing the instructions so read. The computer-readable medium is a tangible medium, and may be a volatile or nonvolatile memory, RAM, ROM, flash drive, optical drive, magnetic drive, etc., as appropriate in a given implementation of the disclosed principles.

The controller operates by receiving a user or other selection of a mode, and by responsively activating the necessary clutches and/or brakes to implement the selected mode. While in a given mode, the controller also coordinates the motor/generators and the engine as appropriate to carry out user or machine commands.

INDUSTRIAL APPLICABILITY

The described system and method are applicable to machines and devices wherein it is desirable to transfer power in a controlled manner from a rotational power source to a ground engaging mechanism such as wheels or tracks. Typically, usage environments include construction, industrial machines and associated equipment. The disclosed principles provide a power transmission that is fully reconfigurable to selectively operate as any one of a number of transmission types depending upon the present needs of the system in which the transmission is used.

In this context, the disclosed system facilitates reconfiguration via selective actuation of individual brakes and clutches to operate in a series, parallel, input CVT, or compound CVT configuration. Moreover, within these modes, others of the brakes and/or clutches may be actuated, and the motors appropriately controlled, to provide specific types of operation. For example, selective actuation of these components allows a parking operation with the engine on, a parking operation with the engine off, a neutral operation, forward low speed operation, forward high speed operation, and so on.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, and not to entirely exclude such from the scope of the disclosure unless otherwise indicated.

Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A multi-mode hybrid drive train for selective operation in any one of series, parallel, and power split modes, the multi-mode hybrid drive train comprising:
    a first planetary gear train having a power input for receiving power from a first motor/generator unit, the first planetary gear train having a first sun gear, first carrier and first ring gear and a second planetary gear train having a power input for receiving power from a second motor/generator unit, the second planetary gear train having a second sun gear, a second carrier connected to a final drive, and a second ring gear;
    a first clutch for selectively clutching the first carrier to the second carrier and a second clutch for selectively clutching the first sun gear to the second ring gear;
    a first brake for selectively braking the first carrier, a second brake for selectively braking the first sun gear, and a third brake for selectively braking the second ring gear; and
    the first motor/generator unit linked to the first sun gear and the second motor/generator linked to the second sun gear such that activation of the clutches, brakes, and motors in a first combination causes the multi-mode hybrid drive train to be in a series mode of operation, activation of the clutches, brakes, and motors in a second combination causes the multi-mode hybrid drive train to be in a parallel mode of operation, and activation of the clutches, brakes, and motors in a third combination causes the multi-mode hybrid drive train to be in a power split mode of operation.

2. The multi-mode hybrid drive train according to claim 1, wherein activation of the clutches, brakes, and motors in the first combination comprises causing the second brake and third brake to be active to place the multi-mode hybrid drive train in the series mode of operation.

3. The multi-mode hybrid drive train according to claim 1, wherein activation of the clutches, brakes, and motors in the second combination comprises causing the first clutch, the first brake, and the second brake to be active to place the multi-mode hybrid drive train in the parallel mode of operation.

4. The multi-mode hybrid drive train according to claim 1, wherein activation of the clutches, brakes, and motors in the third combination comprises causing the second brake and the first clutch to be active to place the multi-mode hybrid drive train in the power split mode of operation.

5. The multi-mode hybrid drive train according to claim 1, wherein actuation of the first clutch and the second clutch places the multi-mode hybrid drive train in a compound CVT mode of operation.

6. The multi-mode hybrid drive train according to claim 1, wherein the first motor/generator unit and second motor/generator unit are electric motors/generators configured to provide rotational energy upon the application of electrical power and to supply electrical power upon the application of rotational energy.

7. The multi-mode hybrid drive train according to claim 1, wherein the first planetary gear train further comprises a primary power input for receiving rotational energy from a primary power source.

8. The multi-mode hybrid drive train according to claim 7, wherein the primary power source is one of an engine and a hydraulic motor.

9. The multi-mode hybrid drive train according to claim 1, further comprising an energy storage system for receiving electrical power generated by the second motor/generator unit.

10. A multi-mode hybrid drive train for selective operation in one a plurality of operational modes, the multi-mode hybrid drive train comprising:
    first and second planetary gear sets;
    a first motor/generator input to the first planetary gear set;
    a second motor/generator input to the second planetary gear set;
    a primary power input for receiving power from a primary power source; and
    a plurality of clutches and a plurality of brakes, located such that selective activation of the plurality of clutches and plurality of brakes places the multi-mode hybrid drive train into one of a series mode of operation, a parallel mode of operation, and a power split mode of operation wherein the first planetary gear set includes a first sun gear, first carrier and first ring gear, wherein the second planetary gear set includes a second sun gear, a second carrier connected to a final drive, and a second ring gear, and wherein the first motor/generator input is linked to the first sun gear and the second motor/generator input is linked to the second sun gear, the multi-mode hybrid drive train further including:
a first clutch for selectively clutching the first carrier to the second carrier and a second clutch for selectively clutching the first sun gear to the second ring gear; and
a first brake for selectively braking the first carrier, a second brake for selectively braking the first sun gear, and a third brake for selectively braking the second ring gear.

11. The multi-mode hybrid drive train according to claim 10, wherein activation of the clutches, brakes, and motors in a first combination comprises causing the second brake and third brake to be active to place the multi-mode hybrid drive train in the series mode of operation.

12. The multi-mode hybrid drive train according to claim 10, wherein activation of the clutches, brakes, and motors in a second combination comprises causing the first clutch, the first brake, and the second brake to be active to place the multi-mode hybrid drive train in the parallel mode of operation.

13. The multi-mode hybrid drive train according to claim 10, wherein activation of the clutches, brakes, and motors in a third combination comprises causing the second brake and the first clutch to be active to place the multi-mode hybrid drive train in the power split mode of operation.

14. The multi-mode hybrid drive train according to claim 10, wherein actuation of the first clutch and the second clutch places the multi-mode hybrid drive train in a compound CVT mode of operation.

15. The multi-mode hybrid drive train according to claim 10, wherein the first motor/generator unit and second motor/generator unit are electric motors/generators configured to provide rotational energy upon the application of electrical power and to supply electrical power upon the application of rotational energy.

16. The multi-mode hybrid drive train according to claim 10, further comprising an energy storage system for receiving electrical power generated by the second motor/generator unit.

17. The multi-mode hybrid drive train according to claim 10, wherein the primary power input is configured to receive power from one of an engine and a hydraulic motor.

* * * * *

UNITED STATES PATENT AND TRADEMARK OFFICE
CERTIFICATE OF CORRECTION

PATENT NO. : 8,317,646 B2
APPLICATION NO. : 12/821372
DATED : November 27, 2012
INVENTOR(S) : Baojun Si It is certified that error appears in the above-identified patent and that said Letters Patent is hereby corrected as shown below:

In the Claims

Column 6, line 54, in Claim 10, delete "in one a plurality" and insert -- in one of a plurality --.

Signed and Sealed this
Eleventh Day of August, 2015

Michelle K. Lee
*Director of the United States Patent and Trademark Office*